(12) United States Patent
Blennow et al.

(10) Patent No.: US 12,331,413 B2
(45) Date of Patent: Jun. 17, 2025

(54) METHOD FOR SUPPLYING OXYGEN-ENRICHED GAS TO AN OXYGEN-CONSUMING PROCESS

(71) Applicant: TOPSOE A/S, Kgs. Lyngby (DK)

(72) Inventors: Bengt Peter Gustav Blennow, Humlebæk (DK); Rainer Küngas, Harjumaa (EE); Jeppe Rass-Hansen, København V (DK); Tobias Holt Nørby, Glostrup (DK); Thomas Heiredal-Clausen, Birkerød (DK); Poul Georg Moses, Birkerød (DK); John Bøgild Hansen, Humlebæk (DK)

(73) Assignee: TOPSOE A/S, Kgs. Lyngby (DK)

( * ) Notice: Subject to any disclaimer, the term of this patent is extended or adjusted under 35 U.S.C. 154(b) by 322 days.

(21) Appl. No.: 17/795,763

(22) PCT Filed: Feb. 5, 2021

(86) PCT No.: PCT/EP2021/052839
§ 371 (c)(1),
(2) Date: Jul. 27, 2022

(87) PCT Pub. No.: WO2021/156457
PCT Pub. Date: Aug. 12, 2021

(65) Prior Publication Data
US 2023/0069515 A1    Mar. 2, 2023

(30) Foreign Application Priority Data
Feb. 6, 2020 (DK) .......................... PA 2020 00154

(51) Int. Cl.
C25B 15/00 (2006.01)
C25B 1/02 (2006.01)
(Continued)

(52) U.S. Cl.
CPC .............. C25B 15/081 (2021.01); C25B 1/02 (2013.01); C25B 1/042 (2021.01); C25B 1/23 (2021.01);
(Continued)

(58) Field of Classification Search
CPC ......... C25B 15/081; C25B 1/042; C25B 2/23; C25B 13/07; C25B 15/087; C25B 9/19; C25B 1/02; C25B 15/02
See application file for complete search history.

(56) References Cited

U.S. PATENT DOCUMENTS 9,284,651 B2   3/2016   Pedersen et al.
9,637,393 B2   5/2017   Heidel et al.
(Continued)

FOREIGN PATENT DOCUMENTS

EP    3031956 A1     6/2016
KR    20160036881 A  4/2016
(Continued)

OTHER PUBLICATIONS

Danish Search Report in corresponding Application No. PA 2020 00154 dated Aug. 4, 2020.
(Continued)

*Primary Examiner* — Zulmariam Mendez
(74) *Attorney, Agent, or Firm* — Boone IP Law

(57) ABSTRACT

In a method for supplying oxygen-enriched gas to an oxygen consuming process, in which the oxygen-enriched gas with a low nitrogen content is generated by supplying an anode-side feed gas comprising $CO_2$ to the anode side of a solid oxide electrolysis cell, oxygen is generated on the anode side of the solid oxide electrolysis cell. This way, an anode-side product gas is formed, in which the oxygen-enriched gas comprises at least a part. The oxygen-enriched gas has a low nitrogen content, and the temperature of the oxygen-en-
(Continued)

Figure 1:
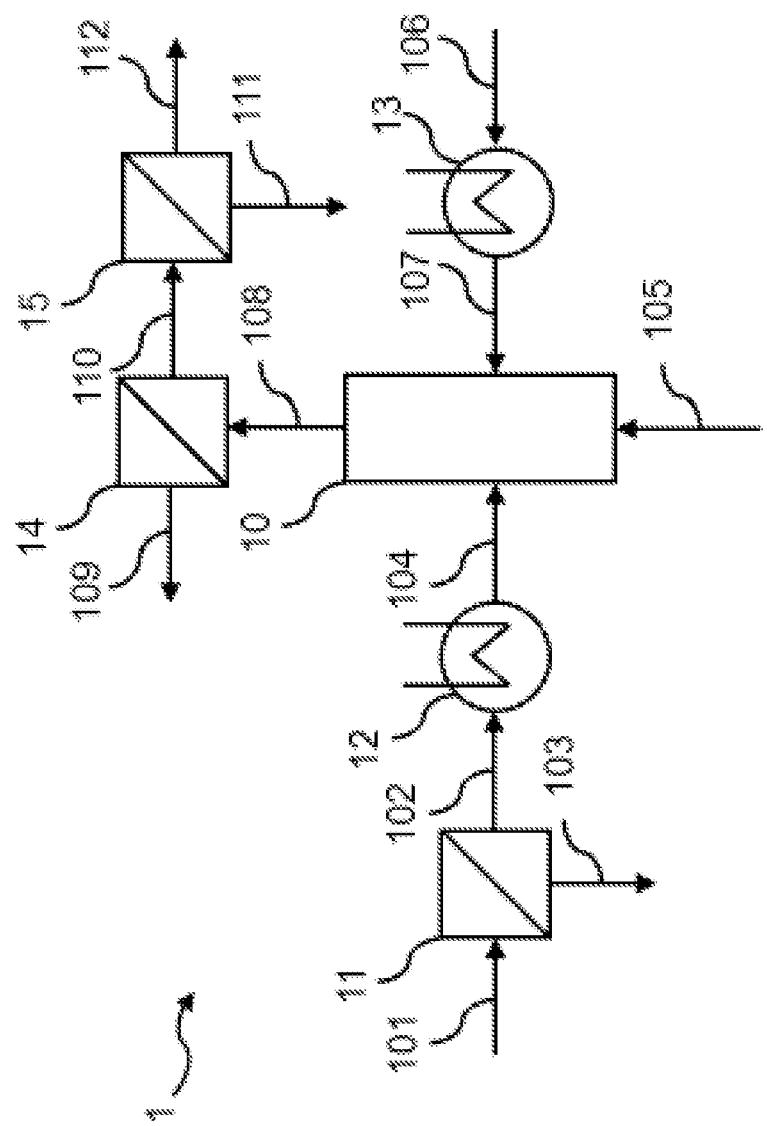

riched gas exiting the solid oxide electrolysis cell is between 600 and 1000° C. The method has multiple advantages, first of all as regards energy saving.

19 Claims, 8 Drawing Sheets

(51) Int. Cl.
*C25B 1/042* (2021.01)
*C25B 1/23* (2021.01)
*C25B 9/19* (2021.01)
*C25B 13/07* (2021.01)
*C25B 15/02* (2021.01)
*C25B 15/08* (2006.01)

(52) U.S. Cl.
CPC ............... *C25B 9/19* (2021.01); *C25B 13/07* (2021.01); *C25B 15/02* (2013.01); *C25B 15/087* (2021.01)

(56) References Cited

U.S. PATENT DOCUMENTS

| 9,975,100 | B2 | 5/2018 | Heidel et al. |
|---|---|---|---|
| 10,494,728 | B2 | 12/2019 | Jakobsson et al. |
| 2009/0235587 | A1* | 9/2009 | Hawkes .................. C25B 1/00 48/202 |
| 2010/0239924 | A1 | 9/2010 | Mcelroy et al. |

FOREIGN PATENT DOCUMENTS

| WO | 2008039783 | A2 | 4/2008 |
|---|---|---|---|
| WO | 2011/137916 | A1 | 11/2011 |
| WO | 2012/159644 | A1 | 11/2012 |
| WO | 2013131778 | A2 | 9/2013 |
| WO | 2014043052 | A1 | 3/2014 |
| WO | 2014114348 | A1 | 7/2014 |
| WO | 2014154253 | A1 | 10/2014 |
| WO | 2015158617 | A1 | 10/2015 |
| WO | 2017116307 | A1 | 7/2017 |
| WO | 2018080571 | A1 | 5/2018 |
| WO | 2018148490 | A1 | 8/2018 |
| WO | 2018228716 | A1 | 12/2018 |
| WO | 2019157507 | A1 | 8/2019 |
| WO | 2019197515 | A1 | 10/2019 |
| WO | 2020011748 | A1 | 1/2020 |

OTHER PUBLICATIONS

European Search Report issued in corresponding Patent Application No. EP 21 18 6582 dated Jan. 14, 2022.
International Preliminary Report on Patentability (PCT/IPEA/409) issued on Jan. 11, 2022, by the European Patent Office for International Application No. PCT/EP2021/052839.
International Search Report (PCT/ISA/210) and Written Opinion (PCT/ISA/237) mailed on May 11, 2021, by the European Patent Office as the International Searching Authority for International Application No. PCT/EP2021/052839. (8 pages).
David W. Keith et al., "A Process for Capture CO2 from the Atmosphere", Joule 2, Aug. 15, 2018, pp. 1573-1594. (27 pages).
S. Darvish et al., "Thermodynamic stability maps for the La0.6Sr0.4Co0.2Fe0.8O3±deCO2eO2 system for application in solid oxide fuel cells", Journal of Power Sources, 336, 2016, pp. 351-359. (9 pages).
V. Esposito et al., "Chemical stability of La0.6Sr0.4CoO3-δ in oxygen permeation applications under exposure to N2 and CO2", Solid State Ionics, 227, 2012, pp. 46-56. (11 pages).
Decision to grant a European patent received for European Application No. 21186582.9, mailed on Dec. 21, 2023, 2 pages.
Decision to grant a European patent received for European Application No. 21703908.0, mailed on Dec. 14, 2023, 2 pages.
Intention to grant received for European Application No. 21186582.9, mailed on Oct. 16, 2023, 6 pages.
Intention to grant received for European Application No. 21703908.0, mailed on Oct. 27, 2023, 6 pages.
International Search Report and Written Opinion received for PCT Patent Application No. PCT/EP2022/069657, mailed on Oct. 13, 2022, 8 pages.

* cited by examiner

METHOD FOR SUPPLYING OXYGEN-ENRICHED GAS TO AN OXYGEN-CONSUMING PROCESS

The present invention relates to a method for supplying an oxygen-enriched gas to an oxygen consuming process, in which the oxygen-enriched gas with a low nitrogen content is generated by supplying an anode-side feed gas comprising $CO_2$ to the anode side of an operating solid oxide electrolysis cell (SOEC). The invention also relates to a solid oxide electrolysis cell supplied with a feed gas comprising $CO_2$, wherein the anode side of the cell is in fluid connection with an oxygen-consuming process.

Oxyfuel combustion is the process of combusting a hydrocarbon fuel in a nitrogen-poor environment, typically in a stream of almost pure oxygen or a mixture of oxygen and carbon dioxide. The main purpose for using oxyfuel combustion in e.g. a coal-fired power plant is to generate flue gas with very high concentrations of $CO_2$ and water vapor, making it possible to separate or capture the $CO_2$ from the flue gas while avoiding the expensive separation of $CO_2$ from gaseous nitrogen. It is important to note that even when oxy-combustion is used, the flue gases still contain impurities, such as residual nitrogen, unburnt oxygen, $SO_2$, nitrogen oxides and particulate material. Much of this will still have to be removed in order to produce carbon dioxide which is pure enough for carbon capture and storage or for other downstream usage.

Oxyfuel combustion for $CO_2$ capture incorporates four main components: 1) an air separation unit (ASU) that provides the oxygen-enriched oxidant stream for combustion, 2) a boiler or a gas turbine, where the fuel is combusted and heat is generated, 3) a flue gas processing unit, where the flue gas is cleared of undesirable species, such as ash, the majority of the sulfur and nitrogen oxides, and 4) a $CO_2$ processing unit (CPU), where the final purification of the $CO_2$ for transport, storage and/or utilization is carried out.

When hydrocarbon fuel is combusted in pure oxygen, the flame temperature is much higher than when the combustion is carried out in air. The peak temperature can reach 2500° C. compared to 1700° C. in a conventional supercritical boiler. The combustion temperature is limited to about 1300-1400° C. in a typical gas turbine cycle and to about 1900° C. in an oxyfuel coal-fired boiler using current technology. In order to alleviate material corrosion issues, which can ultimately lead to boiler failure, some of the $CO_2$-rich flue gas exiting the boiler is commonly mixed with the oxygen-enriched stream that is supplied to the burners. This dilutes the oxygen and reduces the flame temperature to a level similar to the level found in a conventional air-blown plant.

For the combustion of pulverized coal, pilot-scale tests by Coreset and Thambimuthu have reported that the flame temperature and heat capacity of gases to match fuel burning in air occur, when the feed gas used in the oxyfuel combustion has a composition of approximately 35 vol % $O_2$ and 65 vol % dry recycled $CO_2$ (cf. 21 vol % $O_2$ and the rest $N_2$ in air).

Another important aspect in an oxyfuel combustion power plant is understanding the fate of the nitric oxides ($NO_x$), since these nitric oxides contribute to undesirable $HNO_3$ formation during the flue gas compression in the $CO_2$ processing unit. Three major pathways of nitric oxides ($NO_x$) formation are known: 1) thermal NO formation, 2) prompt NO formation and 3) conversion of fuel nitrogen to $NO_x$. In oxyfuel combustion, due to the absence of airborne $N_2$ and, therefore, very low $N_2$ concentrations, the thermal and prompt NO formation pathways can often be neglected. Therefore, NO formation from fuel nitrogen is the most important pathway in boilers using oxyfuel combustion. Approximately 95% of the total NO consists of nitric oxide (NO), the remainder consisting of nitrogen dioxide ($NO_2$) and small amounts of dinitrogen oxide ($N_2O$) and other nitrogen oxides.

Oxygen-enriched streams are also beneficial in oxygen-fired calciners, or oxy-calciners. In fact, oxygen-fired calciners are gaining a wider interest due to their potential use in e.g. direct air capture plants involving calcium looping. For example, David W. Keith et al. describe a process for capturing $CO_2$ from the atmosphere (Joule 2, 1573-1594 (2018)). More specifically, a one megaton $CO_2$ per year plant for direct air capture of $CO_2$ from the atmosphere is described. The process chemistry of said plant is based on two loops: An alkali loop ($CO_2$+KOH to $K_2CO_3$ to KOH) and a calcium loop ($CaCO_3$ to $CaO$+$CO_2$ to $Ca(OH)_2$ to $CaCO_3$). The $CO_2$ is captured by reaction with KOH, giving $K_2CO_3$. This $K_2CO_3$ is reacted with $Ca(OH)_2$ in order to regenerate KOH and give $CaCO_3$, the latter of which is then calcined in an oxygen-fired calciner to release the $CO_2$ and regenerate the Ca-species. Importantly, the calcination step needs to be carried out in a nitrogen-poor atmosphere, as the $CO_2$ (released during the calcination) and the $N_2$ are difficult to separate, once they are mixed. In more detail, the calcium carbonate ($CaCO_3$) formed in the calcium loop is led to the calciner, where this solid material is regenerated back to CaO and $CO_2$, the latter of which is led out of the reactor for purification and compression. The calciner needs an additional heat source to raise the temperature to around 900° C., which is needed for covering the heat requirement of the endothermic calcination reaction. The most obvious way to produce this heat is by using oxyfuel combustion, which produces flue gas containing mostly $CO_2$, as described previously. Again, the oxyfuel combustion requires an ASU. The efficiency of oxy-calciners depends on the oxygen concentration of the oxygen-enriched stream used for the calcination process: the higher the oxygen concentration, the higher the efficiency. The advantages from a higher $O_2$ concentration comes from a lower total gas flow to the furnace, which decreases the heat demand of the furnace. A smaller heat demand means a smaller fuel input, which reduces the required oxygen flow. A smaller furnace decreases the investment cost of the plant and this is significant, especially in the calcium looping process, where the calciner is an insulated reactor.

State-of-the-art oxy-combustion and oxy-calciner plants use ASUs, commonly cryogenic ASUs for providing oxygen-enriched gas streams for the boiler or calciner chambers. An ASU is very expensive (in terms of capital expenditure (CAPEX) as well as operating expenditure (OPEX)). The ASU consumes approximately 225 kWh energy per tonne of $O_2$ produced and is one of the most expensive pieces of equipment in oxyfuel combustion plants and oxy-calciner plants. The goal of this invention is to provide an alternative method for supplying oxygen-enriched gas to oxygen-consuming processes, such as the oxycombustion or oxy-calciner processes described above. More specifically, the invention proposes that the oxygen-enriched stream with a low nitrogen content is generated by supplying an anode-side feed gas comprising $CO_2$ to the anode side of an operating solid oxide electrolysis cell (SOEC) whereby an oxygen-enriched anode-side product gas is obtained.

Solid oxide electrolysis cells (SOECs) can be used to electrochemically reduce $H_2O$ to $H_2$, $CO_2$ to CO or a combination of $H_2O$ and $CO_2$ to syngas ($H_2$ and CO). This conversion occurs on the cathode (fuel) side of the solid oxide electrolysis cell. On the anode (oxy) side of the cell, oxygen is electrochemically generated. In the context of this invention, the term "electrochemically generated" refers to a process where chemical species are formed via an electrochemical process (i.e. a chemical process involving electron transfer). Such processes include e.g. the oxygen evolution reaction ($2O^{2-}=O_2+4e^-$), the water reduction reaction ($H_2O+2e^-=H_2+O^{2-}$) and the carbon dioxide reduction reaction ($CO_2+2e^-=CO+O^{2-}$). Note that the water-gas-shift or the reverse water-gas-shift reactions do not involve electrochemical steps.

In the context of the present invention, the terms "stream", "gas" and "gas stream" are used interchangeably.

In the context of the present invention, the term "at least part of" a certain gas stream it is to be understood that either the entire gas stream or a fraction of the stream is used. The gas stream may simply be split into fractions of identical composition. It is not meant to refer to a separation of the components of the gas. It may for example be relevant if it is desired to recycle a fraction of the gas stream to the solid oxide electrolysis cell. The fraction which is fed to the oxygen/H2/CO consuming process may e.g. be between 5% and as upper limit 10%, 20%, 30%, 40%, 50%, 60%, 70%, 80%, 90% or 100% of the oxygen enriched gas or the H2 and/or CO enriched gas.

The cathode-side feed gas stream may also be referred to as a fuel feed and the anode-side feed gas stream may also be referred to as a flush feed.

Where nothing else is stated, any gas phase percentages given are vol %.

As the cathode-side feed gas comprising $H_2O$ is fed to the cathode side of an operating SOEC, at least part of the $H_2O$ is electrochemically reduced into $H_2$ (i.e. $H_2$ is electrochemically generated), thereby forming a cathode-side product gas that is enriched in hydrogen. In the context of this invention, the term "enriched in X" is understood as "the concentration of X in a stream is increased compared to the concentration of X in the corresponding feed gas". In other words, a cathode-side gas stream enriched in hydrogen (exiting an electrolysis cell) has a higher concentration of hydrogen than the cathode-side feed gas (entering the solid oxide electrolysis cell). Similarly, if a cathode-side feed gas comprising $CO_2$ is fed to the cathode side of an operating SOEC, at least part of the $CO_2$ is electrochemically reduced into CO (i.e. CO is electrochemically generated), thereby forming a cathode-side product gas that is enriched in CO. Furthermore, if a cathode-side feed gas comprising a mixture of $H_2O$ and $CO_2$ is fed to the cathode side of an operating SOEC, at least part of either $H_2O$ or $CO_2$ or both is electrochemically reduced, thereby forming a cathode-side product gas that is enriched in hydrogen and CO. Similarly, an anode-side gas stream enriched in $O_2$ (exiting an electrolysis cell) has a higher concentration of $O_2$ than the anode-side feed gas stream (entering the solid oxide electrolysis cell). Note that according to this definition, a 10% $O_2$, 90% $CO_2$ anode-side product gas stream may be considered to be enriched in $O_2$, if the anode-side feed gas stream has an oxygen content lower than 10%. Similarly, a 10% $O_2$, 90% $CO_2$ anode-side product gas stream is considered to be enriched in $O_2$ according to the definition, although the oxygen content in the gas is lower than in atmospheric air.

The typical operating temperature of SOECs is between approximately 600° C. and 1000° C.: high temperatures are required in order to reach sufficient oxide ion conductivities in the ceramic membranes that are used as electrolytes. Commonly used electrolyte materials include stabilized zirconias, such as yttria-stabilized zirconia (YSZ), doped cerias, doped lanthanum gallates, and others. Commonly used oxy-electrode materials include perovskite materials, such as Sr-doped $LaMnO_3$ (LSM), Sr-doped $LaFeO_3$ (LSF), Sr-doped $LaCoO_3$ (LSC), Sr-doped $La(Co,Fe)O_3$ (LSCF), Sr-doped $SmCoO_3$ and many others. Perovskite materials are further commonly mixed with doped cerias to form composite oxygen electrodes (SOEC anodes). Dopants other than Sr, e.g. Ca, Ba are known, as are materials other than perovskites, e.g. Ruddlesden-Popper phases.

Applicant's WO 2013/131778 A2 and U.S. Pat. No. 10,494,728 B2 both describe the production of high purity CO by electrolysis of $CO_2$ in a solid oxide electrolysis cell or SOEC stack.

Normally, air ($N_2/O_2$) is used as a flush gas on the anode side of SOECs. The concentration of $O_2$ in the gas stream exiting the anode side of the solid oxide electrolysis cell depends on the flow rate of the anode-side feed gas and also the operating current of the SOEC. In principle, close to 100% oxygen can be produced on the anode side, if no feed gas is used or if pure oxygen is used as feed. However, this is normally not done due to the higher risk of degradation of various stack components at high oxygen partial pressures and high temperatures. However, here the advantage obtained is more important than the disadvantage.

In the method of the invention, a stream comprising $CO_2$ with a low nitrogen content is used as feed gas (sometimes also referred to as flush gas) on the anode side of the SOEC instead of air. The resulting product gas is enriched in oxygen and is suitable for use as oxidant in a number of oxygen-consuming processes. In the context of this invention, the term "oxygen-consuming processes" refers to processes where oxygen reacts with other chemical species, thereby oxidizing that latter species. Examples of oxygen-consuming processes include oxy-combustion, oxy-calcining and gasification.

More specifically, the invention relates to a method for supplying oxygen-enriched gas to an oxygen-consuming process, in which at least one operating solid oxide electrolysis cell is provided having a cathode side and an anode side, and a) a cathode-side feed gas stream comprising steam or $CO_2$ or a mixture thereof is supplied to the cathode side of at least one solid oxide electrolysis cell, b) at least part of the cathode-side feed gas stream is electrochemically reduced in the solid oxide electrolysis cell, thereby forming a cathode-side product gas stream that is enriched in hydrogen, carbon monoxide or a mixture thereof, c) at least part of the cathode-side product gas stream is supplied to a hydrogen- and/or carbon monoxide-consuming process, d) an anode-side feed gas stream comprising $CO_2$ is supplied to the anode side of the solid oxide electrolysis cell, and e) oxygen is electrochemically generated on the anode side of the solid oxide electrolysis cell, thereby forming an anode-side product gas stream enriched in oxygen, wherein an oxygen-enriched gas comprising at least part of the anode-side product gas stream enriched in oxygen is fed to the oxygen-consuming process, the oxygen-enriched gas has a low nitrogen content, the content of nitrogen being below 10 vol %, and the oxygen-enriched gas exiting the solid oxide electrolysis cell has a temperature in the range of between 600° C. and 1000° C.; and the oxygen-consuming process is an oxy-combustion process or an oxy-calcining process.

In the context of this invention, the term "hydrogen and/or carbon monoxide-consuming process" refers to processes, where hydrogen or carbon monoxide or both react to form other chemical species. Examples of hydrogen- and/or carbon monoxide-consuming processes include methanol production, ammonia production, hydrotreating, methanation, hydrogenation, carbonylation, hydroformulation (oxo synthesis) and oxidative carbonylation.

The anode-side feed gas stream comprising $CO_2$ may e.g. comprise 0-100 vol % $CO_2$, such as 20-100, 40-100, 50-100, 60-100, 70-100, 80-100 vol % $CO_2$.

In the present context, an oxy-combustion or oxy-combustion process is meant to refer to a process using essentially pure oxygen as oxidant, and importantly the process is conducted in the presence of a low amount of nitrogen (N). The oxy-combustion is meant to refer to a full combustion of the fuel resulting in a product gas which is non-reducing. There will not be a remaining heating value in the product gas.

Gasification is meant to refer to a sub-stoichiometric combustion of the fuel. The product gas will be reducing and there will be a remaining heating value in the product gas.

In the present context, oxy-calcining is meant to refer to an oxy-combustion process where a solid carbonate is decomposed into the corresponding oxide, e.g. CaCO3 into CaO for producing cement.

The term "combustion" is meant to refer to a chemical species which can be oxidized to produce heat (an exothermic oxidation reaction).

According to an embodiment of the invention, the anode-side feed gas and/or the cathode side feed gas is heated prior to feeding it to the solid oxide electrolysis cell. In another embodiment of the invention the oxygen enriched gas is not heated prior to feeding it to the oxygen consuming process. Heating can be dispensed with since the exit temperature of the oxygen enriched gas from the solid oxide electrolysis cell is high, typically above 600° C., or even above 700, 800 or 900° C.

The invention also relates to a solid oxide electrolysis cell, wherein the anode side of the cell is in fluid connection with an oxygen-consuming process, and wherein the cell operates according to the above method.

The method of the invention has multiple advantages. Firstly, as long as an anode-side feed gas with a low nitrogen content is provided to the anode side of the solid oxide electrolysis cell, the oxygen-enriched stream exiting the cell also has a low nitrogen content, and thereby it is highly suitable for use as oxidant in oxycombustion or in oxy-calciners.

According to an embodiment of the present invention the nitrogen content in the oxygen-enriched stream is below 10 vol %, such as below 5 vol %, 3 vol %, 2 vol %, 1 vol % or 0.1 vol %. The less nitrogen, the better.

If, instead of air, a gas stream enriched in oxygen that is simultaneously low in nitrogen content is used as oxidant, the formation of $NO_x$ via thermal and prompt $NO_x$ formation pathways is minimized. Secondly, the flue gas exiting the oxygen-consuming process will be lower in nitrogen ($N_2$) content. The technically challenging task of separating $CO_2$ from $N_2$, e.g. for carbon capture, storage or utilization purposes, will thereby become much easier. Note that even if the oxygen-enriched stream is nitrogen-free, the flue gas may still contain some $N_2$ or $NO_x$, if the fuel used in the oxy-combustion or oxy-calcination process contains nitrogen. Thirdly, since the nitrogen content in the oxygen-enriched stream is low compared to the nitrogen content in air, the energy requirement (i.e. fuel consumption) for heating the stream to the inlet temperature of the oxygen-consuming process is considerably lower, due to the fact that the nitrogen component of air is not heated. Fourthly, the use of oxygen-enriched streams low in nitrogen content allows higher flame temperatures to be achieved in oxy-combustion and oxy-calcination kilns. Fifthly, by using an SOEC for the supply of oxygen-enriched gas, a cryogenic ASU or other ASU is no longer required for air separation. As mentioned above, ASUs are expensive, both in terms of capital costs and in terms of operating expenditures. Sixthly, since the operating temperature of SOECs is approximately between 600° C. and 1000° C., the oxygen-enriched stream exiting the anode-side of the solid oxide electrolysis cell will not require (or will only require very little) pre-heating before entering the oxy-combustion or oxy-calcination kiln, thereby making the process more efficient. It should be noted that oxygen produced using cryogenic air separation would require very significant pre-heating. Seventhly, while the anode-side feed gas comprising $CO_2$ that is fed to the anode-side of the solid oxide electrolysis cell needs to be pre-heated, the heating requirement is lower compared to state-of-the-art solutions without an SOEC. This is because oxygen that is electrochemically generated and which forms part of the oxygen-enriched stream can be at least partly heated using Joule heat generated by the SOEC. Eighthly, the electrochemically generated oxygen, which has hitherto often been considered as a low-value side-product of the electrolysis process, can be used instead of venting it, thereby increasing the efficiency and profitability of the electrolysis process. It is therefore particularly advantageous if both product gases from the SOEC are used, i.e. that anode-side product gas enriched in oxygen is used in an oxygen-consuming process and the cathode-side product gas enriched in $H_2$ and/or CO is simultaneously used in a hydrogen- and/or carbon monoxide-using process. Ninthly, the method offers a simple way of controlling the oxygen content in the oxygen-enriched stream entering the oxygen-consuming process. This is because the concentration of $O_2$ in the gas stream can be easily and rapidly altered by changing the flow rate of the anode-side feed gas or the operating current of the SOEC. Tenthly, if part of the hydrogen and/or carbon monoxide-enriched stream exiting the cathode-side of the SOEC is used as fuel for the oxyfuel combustion or oxy-calcination process, and the oxygen-enriched stream exiting the anode-side of the SOEC is simultaneously used as the oxidant for the same oxyfuel combustion or oxy-calcination process, then the process can potentially be carried out without the need for additional fuel. If renewable or other low-carbon energy sources are used for producing the electricity that is used for running the SOEC, the method of the invention can be carried out with very low $CO_2$ emissions.

The $O_2$ concentration (concentration meaning the same as content in the present context) in the oxygen-enriched carbon dioxide gas is $0<[O_2]\leq 100$ vol %. According to an embodiment, the lower limit for oxygen concentration is 0.1 vol %. In another embodiment, the oxygen concentration is between 10 and 60% and more preferably between 20 and 40%. One molecule of $O_2$ is electrochemically generated for every two molecules of electrochemically generated CO and/or $H_2$.

Accordingly the hydrogen or carbon monoxide or the mixture of hydrogen and carbon monoxide is electrochemically generated on the cathode-side of the at least one solid oxide electrolysis cell and the oxygen is electrochemically generated on the anode-side of the at least one solid oxide electrolysis cell at a molar ratio of (H2+CO):O2 of 2:1.

It is common knowledge within the solid oxide fuel cell and electrolysis field that $CO_2$ affects Sr-containing anode materials, such as e.g. LSC, LSCF and LSM, negatively. More specifically, it has been shown that such materials decompose in the presence of $CO_2$ to form $SrCO_3$ and other phases. For example, V. Esposito et al., *Solid State Ionics*, 227 (2012) 46-56 have demonstrated that LSC with a composition $La_{0.6}Sr_{0.4}CoO_{3-\delta}$, decomposes into $La_{0.6}Sr_{0.4-x}O_{3-\delta''}$+x $SrCO_3$+0.5 ($\delta'+\delta''$) $O_2$+x CoO, when exposed to pure $CO_2$ at 800° C. Here, $\delta'$ and $\delta''$ refer to oxygen non-stoichiometry in the perovskite and x refers to the extent of the decomposition (0<x≤0.4). Decomposition was confirmed by x-ray diffraction and thermogravimetric analysis. The oxygen flux through an LSC membrane (i.e. performance) decreased by more than a factor of 4, when the membrane was exposed to pure $CO_2$ at 780° C. Esposito et al. conclude that "the use of $CO_2$ is particularly detrimental below 800° C.".

S. Darvish et al. (*Journal of Power Sources*, 336 (2016) 351-359) have further studied the probability of $SrCO_3$ formation as a function of temperature, $CO_2$ partial pressure, $O_2$ partial pressure, as well as LSCF composition using thermodynamic and electrochemical calculations. They proposed that LSCF decomposition in $CO_2$-enriched conditions occurs via the following reaction:

$$LSCF(reactant)+CO_2=LSCF(product)+SrCO_3+(Co,Fe)_3O_4+Fe_2O_3,$$

where LSCF(reactant) is the LSCF sample before the $CO_2$ exposure, LSCF(product) is the sample after $CO_2$ exposure (which may have different composition than LSCF(reactant) because of the formation of new phases), $(Co,Fe)_3O_4$ is a cobalt-iron mixed oxide with a spinel structure, where the ratio of Co:Fe may vary, and $Fe_2O_3$ is corundum. S. Darvish et al. demonstrated that high $CO_2$ partial pressures and low $O_2$ partial pressures increased the thermodynamic probability of $SrCO_3$ formation. More specifically, they showed that 1) at temperatures higher than 427° C., $SrCO_3$ becomes stable at lower oxygen partial pressures at all studied temperatures; 2) the higher the temperature, the more significant the impact that any changes in oxygen partial pressure have on the stability of $SrCO_3$. Even more specifically, they show that more than 50% of the $La_{0.6}Sr_{0.4}Co_{0.2}Fe_{0.8}O_3$ (LSCF) should thermodynamically decompose into $SrCO_3$ when exposed to 30 vol % $CO_2$ under reducing conditions (oxygen partial pressure of $10^{-5}$ atm) at 727° C. Furthermore, $SrCO_3$ becomes more stable as the Sr concentration in LSCF is increased and/or the Fe concentration in LSCF is decreased. They also compared the stability of $(La_{0.8}Sr_{0.2})_{0.98}MnO_3$ (LSM) to the stability of $La_{0.6}Sr_{0.4}Co_{0.2}Fe_{0.8}O_3$ (LSCF) and concluded that LSM is more stable than LSCF in $CO_2$-enriched gas.

Now it has surprisingly turned out that under some conditions the issue of perovskite decomposition in $CO_2$-enriched gas is much less severe than expected. More specifically, we have observed very little or no degradation of the LSCF-based electrodes when the anode-side of an operating electrolysis cell or stack is fed with pure $CO_2$ (i.e. under conditions where the partial pressure of $CO_2$ is close to unity and the oxygen partial pressure is approximately $10^{-5}$ atm) under typical SOEC operating temperatures.

While $SrCO_3$ formation is strongly thermodynamically favoured in a gas with such composition, the driving force for $SrCO_3$ formation is significantly decreased by the constant stream of oxygen ions that are being supplied to the anode via the electrolyte. As a result, the SOEC can be operated without significant performance degradation despite the SOEC anode being exposed to a feed gas comprising $CO_2$.

Regarding prior art, oxygen-fired calciners are gaining a wider interest due to their potential use in e.g. direct air capture plants involving calcium looping. For example, as already mentioned, David W. Keith et al. describe a process for capturing $CO_2$ from the atmosphere (Joule 2, 1573-1594 (2018)).

Commonly—as also mentioned in David W. Keith et al.—the oxygen for the oxygen-fired calciner is obtained by cryogenic air separation. However, as already mentioned, an ASU is very expensive (in terms of CAPEX as well as OPEX), so if the oxygen could be provided at a lower energy demand while, at the same time, decreasing the nitrogen content in the gas mixture, this would be highly advantageous.

U.S. Pat. No. 9,975,100 teaches the importance of using oxygen-enriched gas streams that are substantially free of nitrogen for calcination of $CaCO_3$ crystal aggregates. Such gas streams can be obtained by cryogenic ASUs, which are expensive, especially for smaller-scale applications. U.S. Pat. No. 9,975,100 thereby confirms the necessity of avoiding the presence of nitrogen in oxidant streams fed to oxy-fuel calciners.

WO 2008/039783 describes another calcium looping process for high purity hydrogen production, comprising the steps of: (a) gasifying a fuel into a raw synthesis gas comprising CO, hydrogen, and steam, as well as sulfur and halide contaminants in the form of $H_2S$, COS and HX, where X is a halogen; (b) passing the raw synthesis gas through a water gas shift reactor (WGSR) into which CaO and steam are injected, the CaO reacting with the shifted gas to remove $CO_2$, sulfur and X in a solid-phase calcium-containing product comprising $CaCO_3$, CaS and $CaX_2$; (c) separating the solid-phase calcium-containing product from an enriched gaseous hydrogen product, and (d) regenerating the CaO by calcining the solid-phase calcium-containing product in the presence of steam, in the presence of $CO_2$, in the presence of synthesis gas, in the presence of $H_2$ and $O_2$, under partial vacuum, and combinations thereof. The CaO may have a surface area of at least 12.0 $m^2/g$ and a pore volume of at least 0.015 $cm^3/g$, the CaO having a sorption capacity of at least about 70 grams of $CO_2$ per kilogram of CaO.

US 2010/0239924 describes a fuel cell system with partial recycling of anode exhaust. The document only mentions a solid oxide fuel cell system and some recycle systems, but does not deal with production of $O_2$ in a stream comprising $CO_2$ on the oxy-side. Furthermore, the anode of a solid oxide fuel cell refers is the fuel electrode, i.e. the electrode typically comprising metallic Ni.

U.S. Pat. No. 9,637,393 teaches a calcium looping system in which a calciner is included. $CaCO_3$ crystal aggregates are reacted to re-form the calcium oxide, which was used in a previous first step in the process, and release a gas stream containing $CO_2$ via the reaction $CaCO_3(s) \rightarrow CaO(s)+CO_2(g)$.

This reaction takes place at approximately 900° C., requires heat energy as an input, and is carried out in a unit, commonly known as a calciner. The heat could be supplied to the calciner by the combustion of hydrocarbons, such as natural gas, fuel oil, coal or biomass, or by the use of solar heat, electricity or a combination thereof. The calciner employed could be a rotary kiln, a shaft kiln, a flash calciner or a fluidized bed calciner. The necessary heat is supplied when a stream of fuel is combusted with the oxygen in a gas stream, which could consist of air or oxygen from an ASU.

U.S. Pat. No. 9,284,651, belonging to the Applicant, discloses an apparatus for the production of high purity CO by electrolysis of $CO_2$ in a solid oxide electrolysis cell stack with subsequent use of a gas separation unit.

WO 2014/154253, also belonging to the Applicant, teaches the possibility of having different flush gases to be used on the anode side. Specifically, it discloses a process for producing CO from $CO_2$ in an SOEC stack. $CO_2$ is led to the fuel side of the stack with an applied current, and excess oxygen is transported to the oxygen side of the stack, optionally using air or nitrogen to flush the oxygen side. The product stream from the SOEC stack, containing CO mixed with $CO_2$, is subjected to separation.

With regard to the above documents belonging to the Applicant, it has been shown that it is possible to use $CO_2$ on the oxy-side of an SOEC. However, in these documents, the reason for using $CO_2$ instead of air on the anode side is to avoid $N_2$ leaking onto the fuel (cathode) side of the cell through small defects and pinholes which are inevitably present in SOEC electrolytes. $N_2$ leakages are undesirable in case the goal of the SOEC is to produce high-purity CO on the product side, because it is difficult and expensive to remove the $N_2$ from the CO gas, once present. In the present invention, the idea is that a gas comprising $CO_2$ is deliberately used as anode-side feed gas in order to obtain a mixture of $CO_2$ and $O_2$ for downstream use in oxy-calciners or other oxygen-consuming processes.

The SOEC, or the SOEC stack, can produce $H_2$ from $H_2O$ and/or CO from $CO_2$ on the cathode side. This means that any process that requires $H_2$ and/or CO can use the SOEC for these purposes. With the present invention it now also becomes possible to more easily to utilize the oxygen produced on the anode side of the SOEC. This, in turn, means that the SOEC can now be better integrated into various processes or systems where $H_2$ and/or CO and $O_2/CO_2$ mixtures are required. Examples of such different processes include i.a. biomass gasification and oxy-fuel (non-fossil-fueled) processes. In various upstream emitters of $CO_2$, such as cement and steel plants, it will now, with the help of the current invention, be possible to recycle $CO_2$ to obtain both CO and $O_2/CO_2$ mixtures. Importantly, a slip stream from the $CO_2$-rich gas exiting the gasifier, which is e.g. oxygen-fired, can be used as anode-side feed stream for the SOEC.

According to an aspect of the present invention a plant is provided comprising a solid oxide electrolysis cell (17) having an anode side (17A) and a cathode side (17C), wherein the anode side of the cell (17A) is in fluid connection with an oxygen-consuming unit selected from an oxy-combustion unit or an oxy-calcining unit (10,20) and the cathode side of the cell is in fluid connection with a hydrogen- and/or carbon monoxide-consuming unit (18), and wherein the plant is configured to operate the method according to any of the preceding claims. An oxy-combustion unit is a unit comprising relevant hardware for conducting the oxy-combustion process, such as the oxycombustion processes mentioned earlier. An oxy-calcining unit is a unit comprising relevant hardware for conducting the oxy-calcining process, such as the oxy-calcining processes mentioned earlier.

In the present context, "fluidly connected means that free fluid passage is ensured both when in operation and out of operation unless active action is or has been taken to close the connection. There may be control means configured to control or split the gas stream flows to the oxygen consuming unit and/or to the hydrogen- and/or carbon monoxide-consuming unit.

According to an embodiment of the invention, the oxygen-consuming unit of the plant may be an oxy-calcining unit, and the hydrogen- and/or carbon monoxide-consuming unit may be one and the same oxy-calcining unit.

According to an embodiment of the invention, the plant comprises control means configured to control the flow from the anode side of the solid oxide electrolysis cell to the oxygen-consuming unit. Such control means comprises valves or other hardware for reducing or splitting the gas stream.

According to an embodiment of the invention, the plant comprises control means configured to control the flow from the cathode side of the solid oxide electrolysis cell to the hydrogen- and/or carbon monoxide-consuming unit. Such control means comprises valves or other hardware for reducing or splitting the gas stream.

The invention is described in more detail in the examples which follow.

EXAMPLE 1 (COMPARATIVE EXAMPLE)

In FIG. 1, a method (1) according to current state-of-the-art is presented, wherein oxygen-enriched gas (104) is fed to an oxy-calciner (10) and the oxygen-enriched gas (104) originates from a cryogenic air separation unit (11). More specifically, an air stream (101) is fed to a cryogenic air separation unit (11) and is thereby separated into an oxygen-enriched gas stream (102) and an oxygen-deficient gas stream (103). The gas stream (102) is pre-heated (e.g. to around 650° C.) using a preheater (12), and the preheated stream (104) is thereafter fed to the oxy-calciner (10). Simultaneously, a stream of fuel (105) is fed to the oxy-calciner (10), and the stream is optionally preheated (not shown). A stream of solid material comprising calcium carbonate (106) is pre-heated (e.g. to around 650° C.) using a second preheater (13) and the pre-heated stream of solid material (107) is fed to the oxy-calciner (10). Fuel (105) reacts with the oxygen in the oxygen-enriched gas stream (104), and the exothermic combustion reaction raises the temperature in the oxy-calciner (10) to around 900° C., which causes the calcium carbonate in the solid material (107) to decompose into calcium oxide and carbon dioxide in the oxy-calciner (10). A suitable oxy-calciner design for the purpose is a circulating fluidized bed (CFB) calciner. The output stream (108) from the oxy-calciner, comprising calcium oxide, carbon dioxide and steam, is fed to a first separator (14), such as a cyclone, where the stream is separated into a stream comprising calcium oxide (109) and a stream comprising carbon dioxide and steam (110). The stream (110) is further fed to a second separator (15), such as a water knockout vessel, where the stream (110) is separated into a stream comprising $H_2O$ (111) and a stream comprising carbon dioxide (112).

An oxy-calciner with a capacity to calcine 300 tonnes calcium carbonate per hour requires approximately 13 tonnes methane or natural gas per hour as fuel and approximately 60 tonnes oxygen-enriched gas per hour as oxidant, assuming the oxygen content in the oxygen-enriched stream (102,104) is approximately 95%. The main impurity in the oxygen-enriched stream (102,104) originating from an air separation unit (11) is nitrogen. The higher the required oxygen content in the oxygen-enriched stream (102), the lower is the efficiency of the air separation unit (11). Output streams from a 300 tonnes/h oxy-calciner are, for example, a stream comprising calcium oxide (109) with a flow rate of 165 tonnes/hr, a stream comprising $H_2O$ (111) with a flow rate of 30 tonnes/hr, and a stream comprising carbon dioxide (112) with a flow rate of approximately 170 tonnes/hr. The composition of the stream comprising carbon dioxide (112) is for example 97% $CO_2$, 1% $O_2$, 1.5% $N_2$ and 0.01% $H_2O$. Although the pre-heaters (12,13) and separator units (14,15) are shown in FIG. 1 as separate units, pre-heating and separation may be carried out in units that combine the functions of pre-heaters and the functions of separators, e.g. in solid-gas cyclones. For example, the pre-heating of oxygen-enriched stream (102) may be carried out in a cyclone in the presence of calcium oxide product from the oxy-calciner.

EXAMPLE 2

Figure 2:
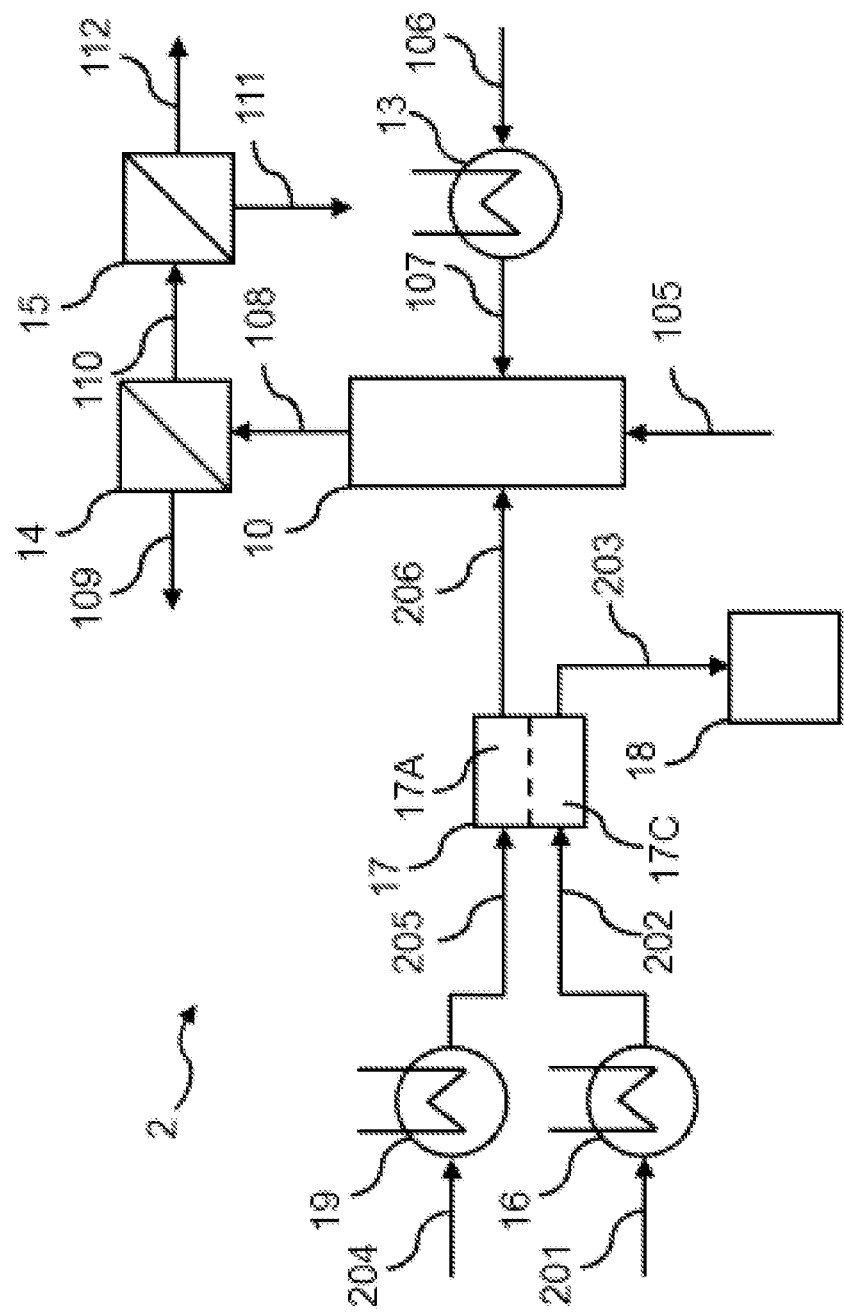

In FIG. 2, a preferred embodiment of the method (2) according to the invention is presented, wherein oxygen-enriched gas (206) is fed to an oxy-calciner (10), the oxygen-enriched gas (206) is obtained by flushing the anode (oxy) side (17A) of at least one operating solid oxide electrolysis cell (17) with a feed gas (205) comprising $CO_2$, and wherein at least part of the first cathode-side product gas (203) comprising carbon monoxide and/or hydrogen, is supplied to a hydrogen- and/or carbon monoxide-consuming process (18). More specifically, a first cathode-side feed stream (201), comprising water or steam or $CO_2$ or a mixture thereof, is pre-heated using a cathode-side preheater (16) and the preheated first cathode-side feed stream (202) is thereafter fed to the cathode side (17C) of at least one solid oxide electrolysis cell (17).

Simultaneously, a first anode-side feed gas comprising carbon dioxide (204) is pre-heated using an anode-side preheater (19) and the pre-heated first anode-side feed gas (205) is fed to the anode (oxy) side (17A) of the solid oxide electrolysis cell. External voltage is applied to the solid oxide electrolysis cell (17), thereby providing a driving force for the electrochemical reduction of at least part of the carbon dioxide and/or steam in the first cathode-side feed stream (202) into carbon monoxide and/or hydrogen, thereby forming a first cathode-side product gas (203) that is enriched in hydrogen, carbon monoxide or a mixture thereof. Part of (not shown) or all of the first cathode-side product gas (203) is supplied to a hydrogen- and/or carbon monoxide-consuming process (18), such as a methanol production process, ammonia production process, a hydrotreating process, a methanation process, a hydrogenation process, a carbonylation process, a hydroformulation (oxo synthesis) process, or an oxidative carbonylation process. The externally applied voltage drives an electrochemical oxidation reaction on the anode side (17A) of the solid oxide electrolysis cell, whereby oxygen ions ($O^{2-}$) are converted into molecular oxygen ($O_2$). The electrochemically generated $O_2$ is mixed with the pre-heated first anode-side feed gas comprising carbon dioxide (205), thereby forming a first anode-side product gas, the oxygen-enriched gas (206), with a low nitrogen content. The operating temperature of the solid oxide electrolysis cell (17) is generally between 600° C., and 1000° C., and preferably between 600° C., and 900° C. 700° C., and 850° C. Due to the high operating temperature of the solid oxide electrolysis cell, the oxygen-enriched stream (206) does not need to be heated further before being fed into the oxy-calciner (10) but may be passed through heat exchangers (not shown). It is further understood that other aforementioned streams may be passed through heat exchangers for better thermal integration.

Simultaneously, a stream of fuel (105) is being fed to the oxy-calciner (10) and the stream is optionally preheated (not shown). A stream of solid material comprising calcium carbonate (106) is pre-heated (e.g. to around 650° C.) using a preheater (13), such as a solid-gas cyclone, and the preheated stream of solid material (107) is fed to the oxy-calciner (10). Fuel (105) reacts with the oxygen in the oxygen-enriched stream (206) and the exothermic combustion reaction raises the temperature in the oxy-calciner (10) to around 900° C., which causes the calcium carbonate in the solid material (107) to decompose into calcium oxide and carbon dioxide in the oxy-calciner (10). The output stream (108) from the oxy-calciner, comprising calcium oxide, carbon dioxide and steam is fed to a first separator (14), such as a cyclone, where the stream is separated into a stream comprising calcium oxide (109) and a stream comprising carbon dioxide and steam (110). The stream (110) is further fed to another separator (15), such as a water knockout vessel, where the stream is separated into a stream comprising $H_2O$ (111) and a stream comprising carbon dioxide (112).

An oxy-calciner with a capacity to calcine 300 tonnes of calcium carbonate per hour requires approximately 13 tonnes of methane or natural gas per hour as fuel and approximately 61 tonnes of oxygen-enriched gas per hour as oxidant, assuming the oxygen content in the oxygen-enriched stream (206) is 95 vol %, balance $CO_2$. The required flow rate of the first anode-side feed stream (204) depends on the desired oxygen-content in the oxygen-enriched stream (206). In order to feed 61 tonnes of an oxygen-enriched gas (206) comprising 95 vol % $O_2$ in $CO_2$ to the oxy-calciner, approximately 4 tonnes of $CO_2$ have to be supplied to the anode side (17A) of the electrolysis unit (17). The amount of oxygen produced by the solid oxide electrolysis cell (17) is determined by Faraday's law: for producing 57 tonnes per hour of oxygen, the required electric current through the electrolysis unit is approximately 191 000 000 A. Typical electrolysis currents for solid oxide electrolysis cells range from 0.5 A/cm$^2$ to 1 A/cm$^2$. The required electrode area for the electrolysis unit (17) under abovementioned conditions ranges therefore between 19100 m$^2$ and 38200 m$^2$. Such an electrolysis unit would produce approximately 7 tonnes of hydrogen per hour on the cathode side of the cell, when pure water or steam is used as the first cathode-side feed stream (201) to the cell or approximately 100 tonnes of CO per hour on the cathode side of the cell, when pure $CO_2$ is used as the first cathode-side feed stream (201) to the cell. Highest system efficiencies are achieved when the electrolysis unit (17) is operated close to the thermoneutral voltage.

The nitrogen content of the oxygen-enriched gas stream (206) is determined by the nitrogen content in the first anode-side feed gas stream (204). For example, if the first anode-side feed gas stream (204) has a nitrogen content of 1 vol % and the desired oxygen content in the oxygen-enriched stream (206) is 95 vol %, then the resulting nitrogen content in the oxygen-enriched gas stream (206) is approximately 0.05 vol %.

EXAMPLE 3

Figure 3:
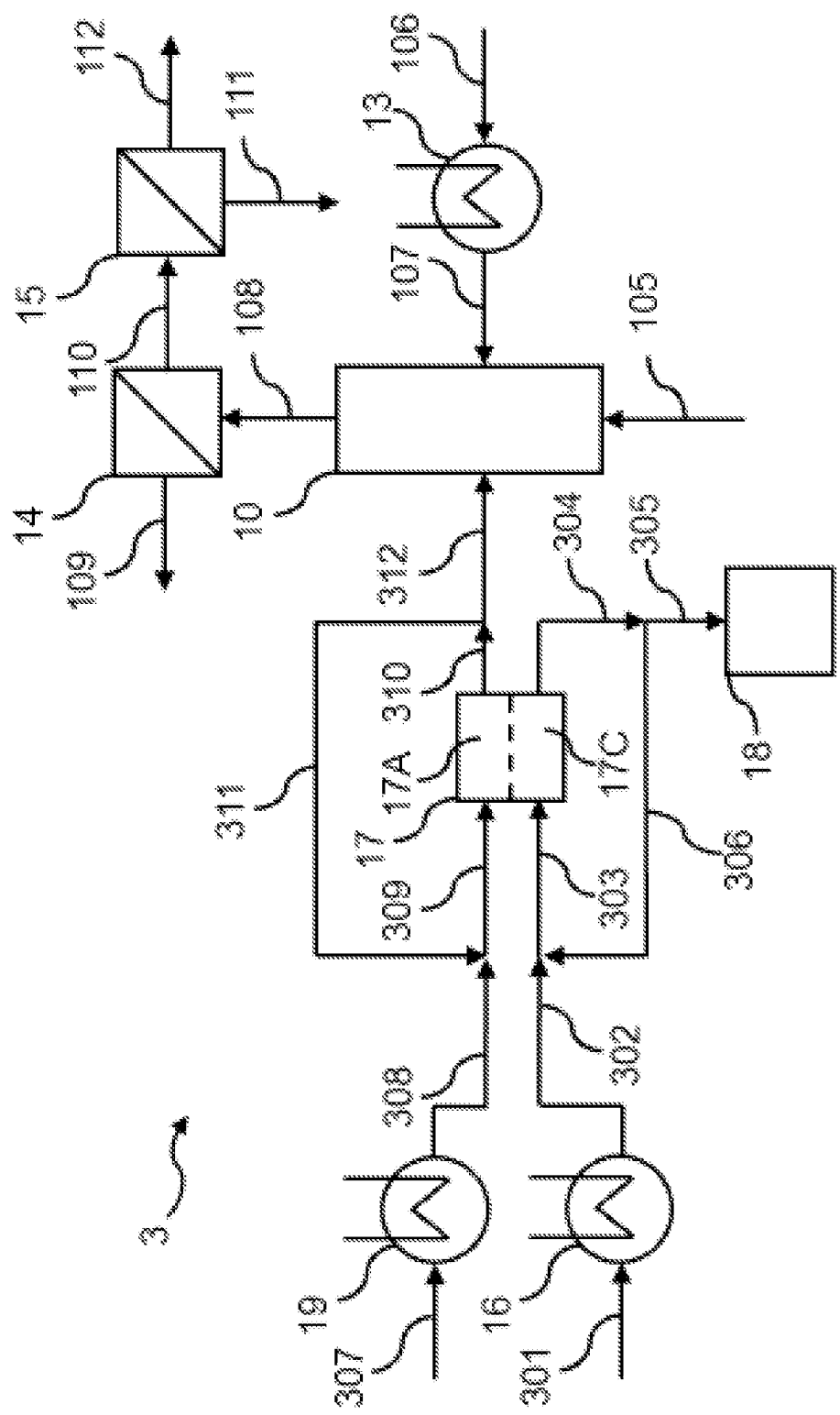

In FIG. 3, a preferred embodiment of the method (3) according to the invention is presented, wherein oxygen-enriched gas (312) is fed to an oxy-calciner (10), the oxygen-enriched gas (312) is obtained by flushing the anode (oxy) side (17A) of at least one solid oxide electrolysis cellsolid oxide electrolysis cell (17) with a anode-side feed gas (308,309) comprising $CO_2$, and wherein at least part of the first cathode-side product gas (304,305), enriched in carbon monoxide and/or hydrogen, is supplied to a hydrogen- and/or carbon monoxide-consuming process (18), and where part of either or both of the product gas streams (304,310) from the solid oxide electrolysis cellsolid oxide electrolysis cell (17) are recycled back to the cell. More specifically, a first cathode-side feed stream (301), comprising water or steam or $CO_2$ or a mixture thereof, is pre-heated using a cathode-side preheater (16). The preheated first cathode-side feed stream (302) is optionally mixed with a first cathode-side recycle stream (306), thereby obtaining a second cathode-side feed stream (303), which is fed to the cathode side (17C) of at least one solid oxide electrolysis cell (17). External voltage is applied to the solid oxide electrolysis cell (17), thereby providing a driving force for the electrochemical reduction of at least part of the carbon dioxide and/or steam in the second cathode-side feed stream (303) into carbon monoxide and/or hydrogen, thereby forming a first cathode-side product gas (304) that is enriched in hydrogen, carbon monoxide or a mixture thereof. Optionally, part of the first cathode-side product gas (304), is recycled back to the electrochemical cell (17) as a first cathode-side recycle stream (306). The remainder of the first cathode-side product gas (305) is supplied to a hydrogen- and/or carbon monoxide-consuming process (18). Although not specifically shown in FIG. 3, the splitting of the first cathode-side product gas (304) into streams (305) and (306) may be carried out in a separation unit, such as a pressure-swing adsorber or a temperature-swing adsorber or a separation membrane. Additional blowers or compressors may be included to increase the pressure of the stream (304).

Simultaneously, a first anode-side feed stream comprising carbon dioxide (307) is pre-heated using an anode-side preheater (19). The pre-heated first anode-side feed stream (308) is optionally mixed with a first anode-side recycle stream (311), thereby obtaining a second anode-side feed stream (309), which is fed to the anode side (17C) of at least one solid oxide electrolysis cell (17). The externally applied voltage drives an electrochemical oxidation reaction on the anode side (17A) of the solid oxide electrolysis cell, whereby oxygen ions ($O^{2-}$) are converted into molecular oxygen ($O_2$). The electrochemically generated $O_2$ is mixed with the second anode-side feed gas comprising carbon dioxide (309), thereby forming a first anode-side product gas (310) with a low nitrogen content. Optionally, part of the first anode-side product gas (310), enriched in oxygen, is recycled back to the electrochemical cell (17) as a first anode-side recycle stream (311). The remainder of the first anode-side product gas, the oxygen-enriched gas (312), is Oxy-calciner+SOEC, with $CO_2$ recycle from flue gas to SOEC fed into the oxy-calciner (10). Although not specifically shown in FIG. 3, the splitting of the first anode-side product gas (310) into streams (311) and (312) may be carried out in a separation unit, such as a pressure-swing adsorber or a temperature-swing adsorber or a separation membrane. Additional blowers or compressors may be included to increase the pressure of the stream (310). Due to the high operating temperature of the solid oxide electrolysis cell, the oxygen-enriched stream (312) does not need to be heated further but may be passed through heat exchangers (not shown). It is further understood that other aforementioned streams may be passed through heat exchangers or additional pre-heaters for better thermal integration.

EXAMPLE 4

Figure 4:
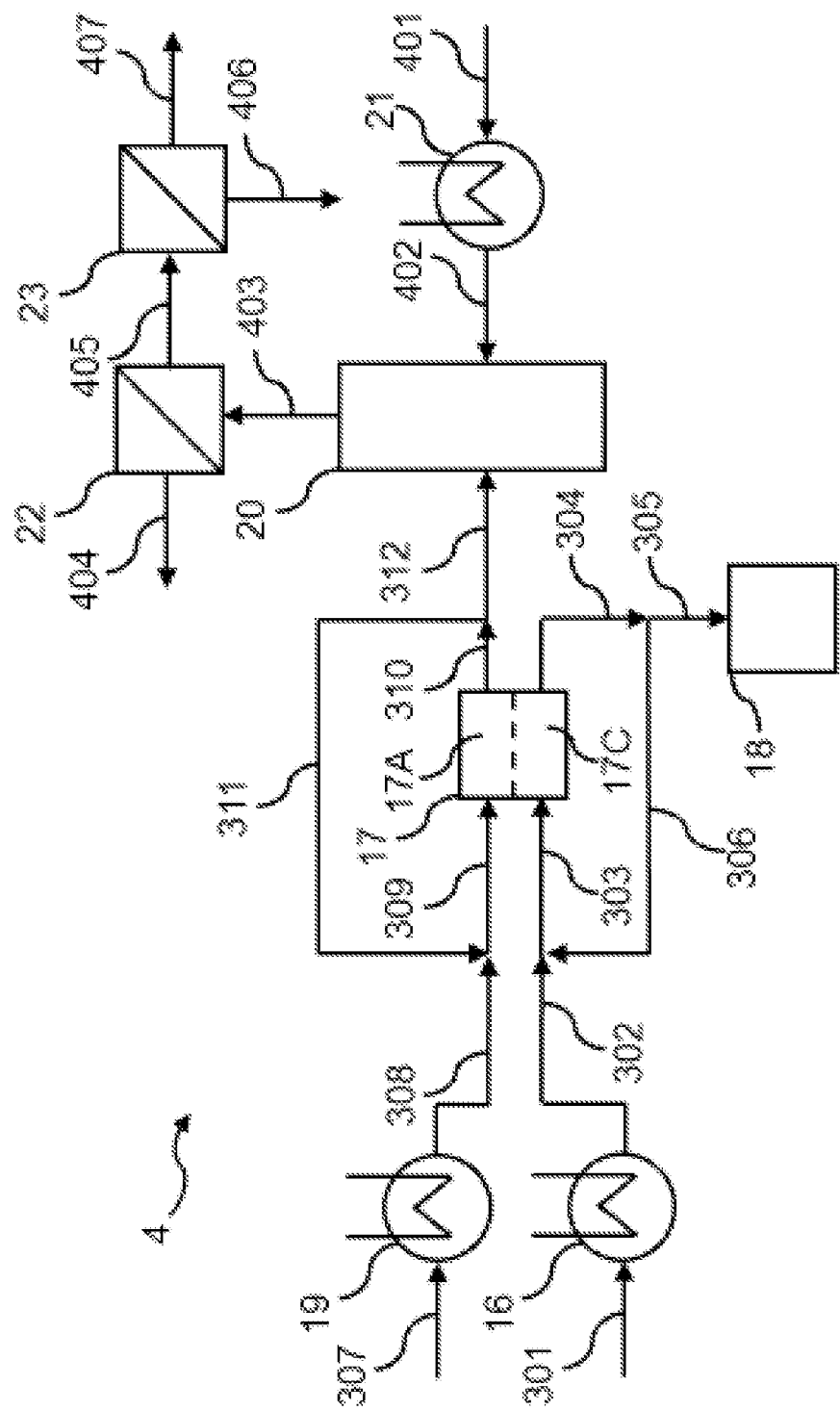

In FIG. 4, a preferred embodiment of the method (4) according to the invention is presented, wherein oxygen-enriched gas (312) is fed to an oxyfuel combustion chamber (20), the oxygen-enriched gas (312) is obtained by flushing the anode (oxy) side (17A) of at least one solid oxide electrolysis cell (17) with a anode-side feed gas (308,309) comprising $CO_2$, and wherein at least part of the first cathode-side product gas (304,305), enriched in carbon monoxide and/or hydrogen, is supplied to a hydrogen- and/or carbon monoxide-consuming process (18), and where part of either or both of the output gas streams from the solid oxide electrolysis cell (17) are recycled back to the cell as described in Example 3. Advantageously, the oxygen content in the first anode-side product gas (310,312) is between 20 vol % and 40 vol %, for example 35 vol % to match the heat capacity of air and to obtain flame temperatures similar to flame temperatures in air-blown kilns. It is understood that the aforementioned streams may be passed through heat exchangers or additional pre-heaters for better thermal integration. Suitable oxyfuel combustion chamber designs for the purpose are pulverized fuel kilns or circulating fluidized bed (CFB) kilns. Simultaneously, a stream of solid fuel (401), comprising e.g. coal, wood or biomass, is optionally pre-heated using a preheater (21), thereby obtaining a pre-heated solid fuel stream (402). The pre-heated solid fuel stream (402) is fed to the oxyfuel combustion chamber (20). In the combustion chamber (20), solid fuel (402) reacts with the oxygen in the oxygen-enriched gas stream (312) and the exothermic combustion reaction raises the flame temperature near the burner (1 to 4 meters from the burner) to above 1100° C., and up to 1900° C. The output stream (403) from the oxyfuel combustion chamber (20), comprising solid combustion residues, carbon dioxide and steam is fed to a first separator (22), such as a cyclone, where the stream is separated into a stream comprising solid combustion residues (404) and a stream comprising carbon dioxide and steam (405). The stream (405) is further fed to a second separator (23), such as a water knockout vessel, where the stream is separated into a stream comprising $H_2O$ (406) and a stream comprising carbon dioxide (407). Further separation steps may be required and are known to those skilled in the art.

A 0.21 MW pilot-scale coal oxycombustion unit requires a solid fuel (coal) stream (401) of 31 kg per hour and an oxygen-enriched stream (312) of 233 kg per hour, assuming the oxygen-content in the oxygen-enriched stream (312) is 35 vol %, balance $CO_2$ and an oxygen excess of 5%. The output stream (403) from the oxyfuel combustion chamber (20) contains less nitrogen oxides ($NO_x$) compared to air-blown kilns. $NO_x$ concentration is a function of the flame temperature, and thereby increases when oxygen-enriched streams (312) with higher oxygen contents are used. The nitrogen content in the solid fuel stream (401,402) also affects $NO_x$ concentration in stream (403).

EXAMPLE 5

Figure 5:
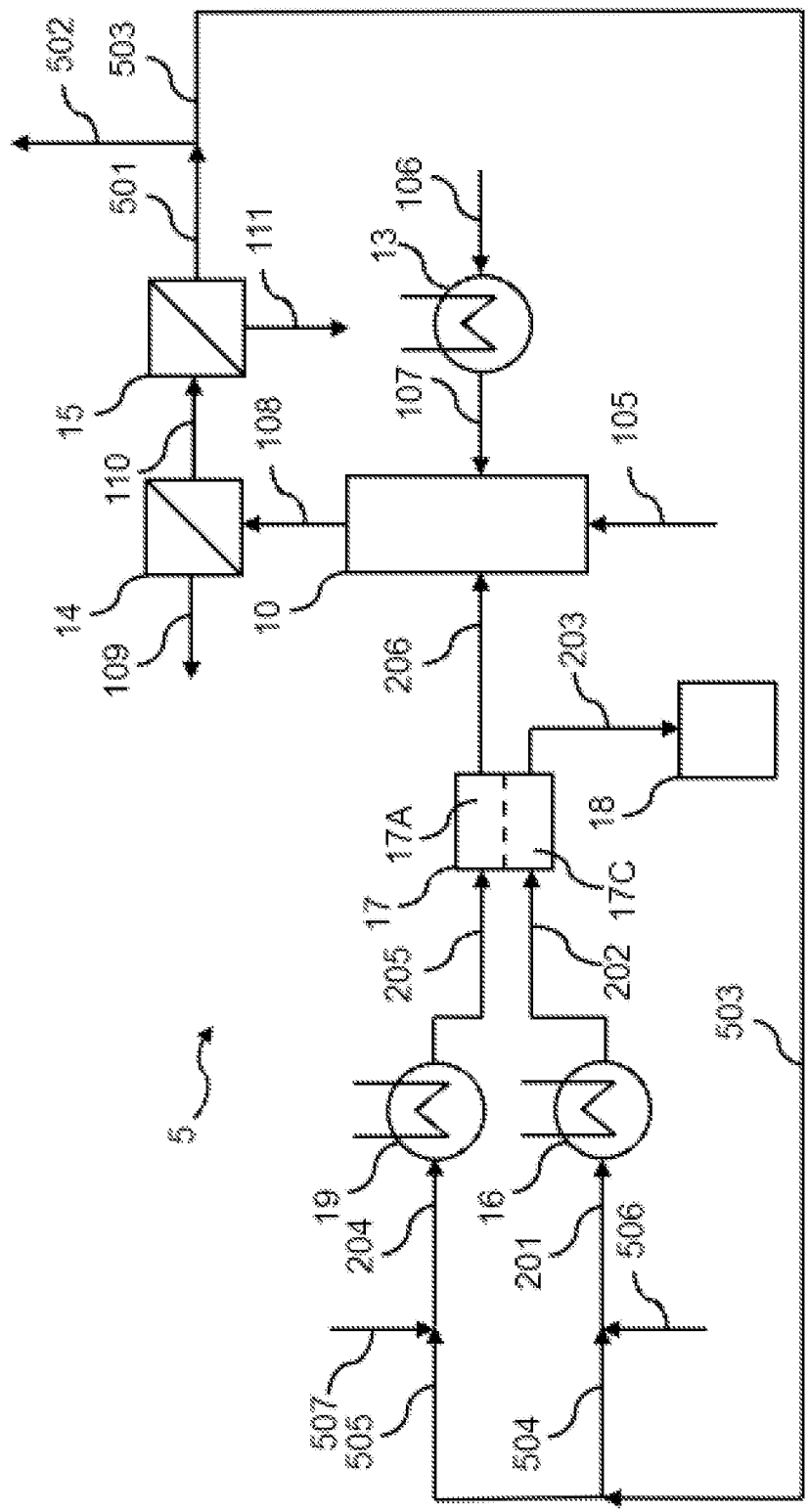

In FIG. 5, another preferred embodiment of the method (5) according to the invention is presented, wherein oxygen-enriched gas (206) is fed to an oxy-calciner (10), the oxygen-enriched gas (206) is obtained by flushing the anode (oxy) side (17A) of at least one solid oxide electrolysis cell

(17) with a first anode-side feed gas (205) comprising $CO_2$, wherein at least part of the carbon monoxide and/or hydrogen containing gas (203) is supplied to a hydrogen- and/or carbon monoxide-consuming process (18), and wherein a flue gas stream comprising carbon dioxide (503) is recycled, i.e. at least a part of either or both of the feed gas streams (201,204) to the electrolysis unit comprise at least part of the flue gas stream comprising carbon dioxide (503). Specifically, the flue gas stream comprising carbon dioxide (501) is split into two equal or non-equal parts, wherein the first part of the stream comprising carbon dioxide (502) is led out of the process, while the second part of the stream comprising carbon dioxide (503) is used to supply the electrolysis stack with feed gas. More specifically, stream (503) is split into two equal or non-equal parts (504,505), wherein stream (504) is optionally mixed with a supplementary cathode-side feed stream (506) comprising water or steam or $CO_2$ or a mixture thereof, thereby obtaining a first cathode-side feed stream (201). Stream (505) is optionally mixed with a supplementary anode-side feed stream (507) comprising $CO_2$, thereby obtaining the first anode-side feed gas (204). In an embodiment of the method according to the invention, the supplementary gas stream (506) comprises steam and is low in $CO_2$ content. It is understood that the stream comprising carbon dioxide (503) may be supplied to either or both sides of the solid oxide electrolysis cell (17).

EXAMPLE 6

Figure 6:
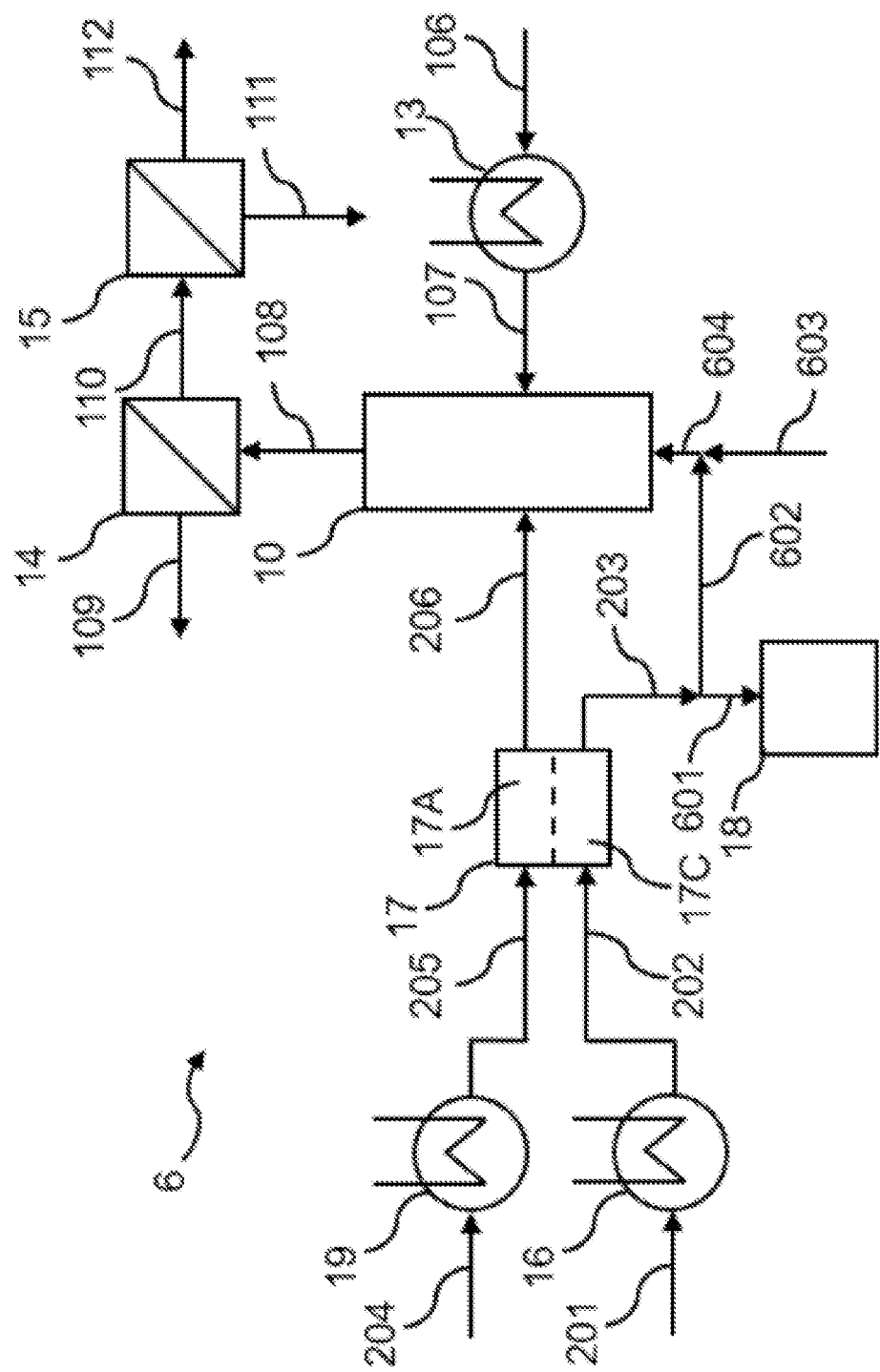

In FIG. 6, another preferred embodiment of the method (δ) according to the invention is presented, wherein oxygen-enriched gas (206) is fed to an oxy-calciner (10), the oxygen-enriched gas (206) is obtained by flushing the anode (oxy) side (17A) of at least one solid oxide electrolysis cell (17) with a feed gas (205) comprising $CO_2$, and wherein at least part of the first cathode-side product gas (203), comprising carbon monoxide and/or hydrogen, is supplied to a hydrogen- and/or carbon monoxide-consuming process (18), and wherein simultaneously a part of the carbon monoxide and/or hydrogen containing first cathode-side product gas (203) is supplied as fuel stream (602) to the oxy-calciner (10). More specifically, the first cathode-side product gas (203) is split into two equal or non-equal parts (601,602). Stream (601) is supplied to a hydrogen- and/or carbon monoxide-consuming process (18), whereas stream (602) is used as fuel in the oxy-calciner (10). The stream (602), enriched in hydrogen and/or carbon monoxide, may be mixed with additional fuel (603), such as methane, natural gas, hydrogen, carbon monoxide etc, thereby obtaining a combined fuel stream (604) that is fed into the oxy-calciner (10). It is understood that part of streams (203,206) may be recycled back to the corresponding sides of the solid oxide electrolysis cell, as described in Example 3 and 4 and not explicitly shown in FIG. 6.

EXAMPLE 7

Figure 7:
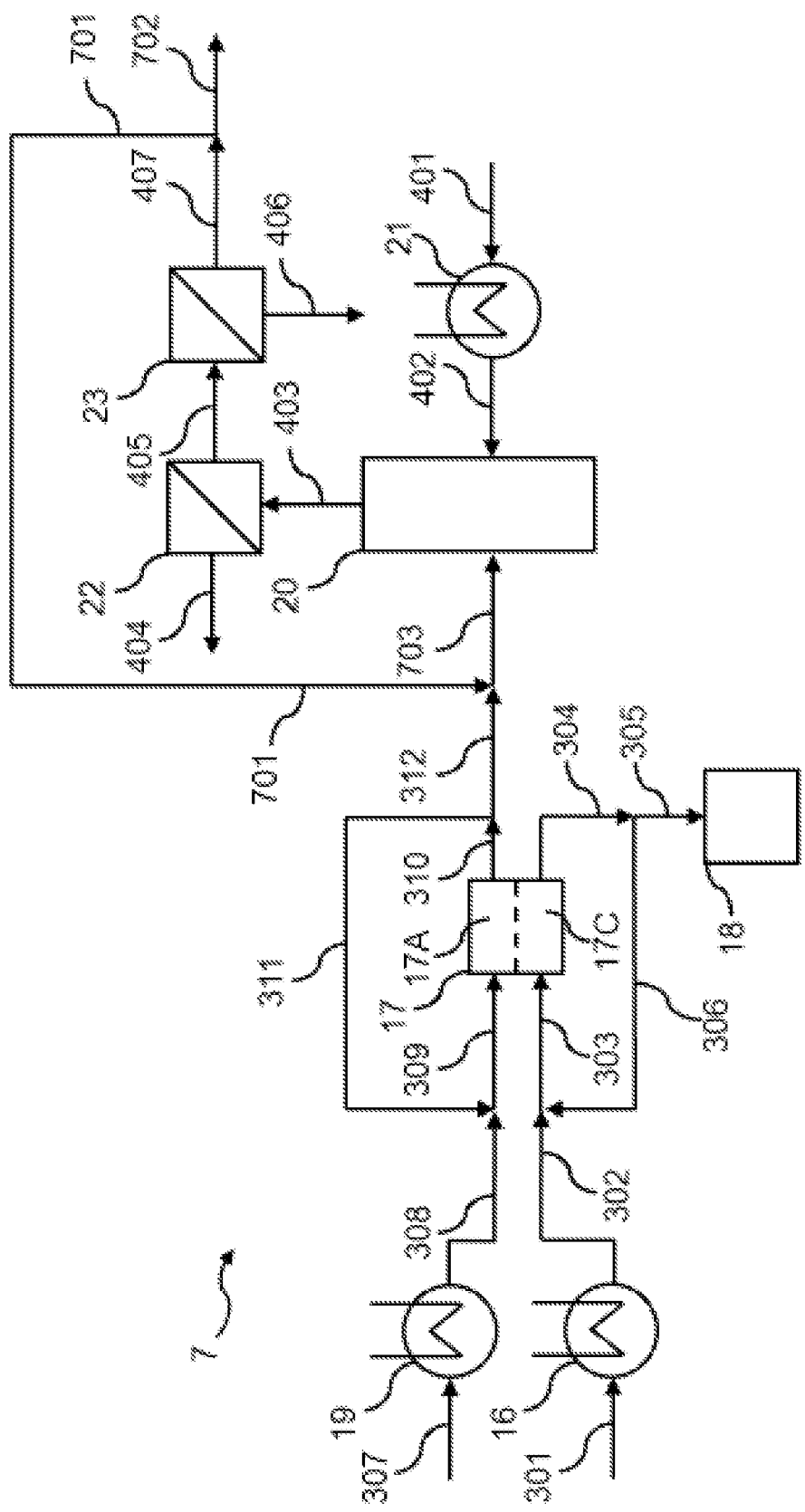

In FIG. 7, a preferred embodiment of the method (7) according to the invention is presented, wherein oxygen-enriched gas (703) is fed to an oxyfuel combustion chamber (20), wherein the oxygen-enriched gas (703) is obtained by mixing (in equal or non-equal parts) the following gas streams: a first anode-side product gas, enriched in oxygen (312), obtained by flushing the anode (oxy) side (17A) of at least one solid oxide electrolysis cell (17) with a anode-side feed gas (308,309) comprising $CO_2$, and a flue gas stream (701), obtained by splitting the flue gas stream comprising $CO_2$ (407) in two equal or non-equal parts (701,702). The stream (702) is led out of the system, while stream (701) is recycled, as explained above. Advantageously, the oxygen content in the first anode-side product gas (310,312) is between 90 vol % and 100 vol %, for example 95 vol %, to minimize total gas flow rate though the anode compartment of the solid oxide electrolysis cell. Advantageously, the oxygen content in the oxygen-enriched gas (703) is between 20 vol % and 40 vol %, for example 35 vol %, to match the heat capacity of air and to obtain flame temperatures similar to flame temperatures in air-blown kilns.

EXAMPLE 8

Figure 8:
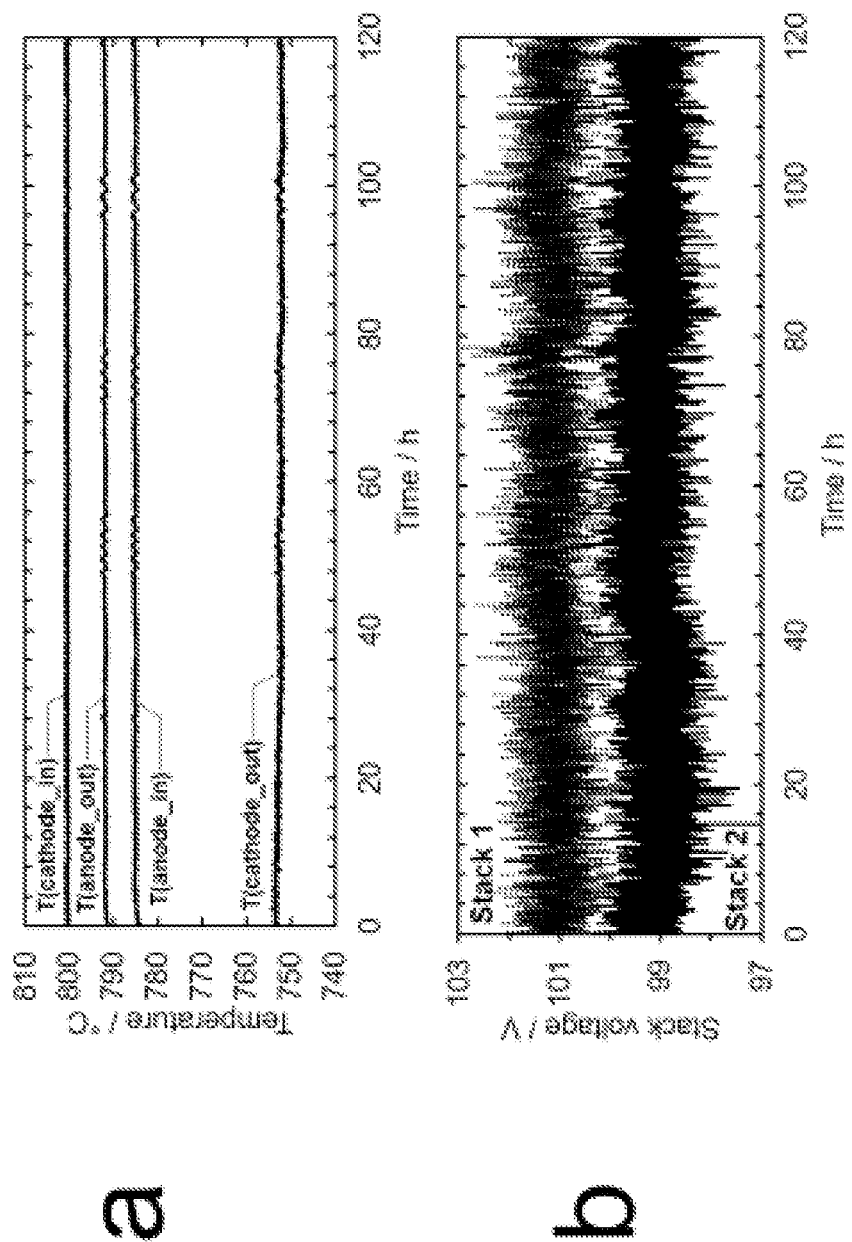

Two identical solid oxide electrolysis cell stacks, each comprising 75 cells with a total active area of approximately 8250 cm$^2$, were operated for 120 hours in electrolysis mode (FIG. 8). A first cathode-side feed stream (301) comprising 99.9% $CO_2$ was mixed with a first cathode-side recycle stream (306), comprising CO and $CO_2$, thereby obtaining a second cathode-side feed stream (303). The second cathode-side feed stream (303) was simultaneously introduced onto the cathode-side compartments of both stacks at a temperature of 800° C. (FIG. 8a). An electrolysis current was passed through both stacks, resulting in a fraction of the $CO_2$ in the cathode-side feed stream to be electrochemically converted into CO, thereby enriching the first cathode-side product stream (304) exiting the stacks with CO. The temperature of the stream (304) exiting the stack was 751-753° C. The gas was compressed and fed to a pressure-swing adsorber unit. The CO-rich exit stream (305) from the pressure-swing adsorber unit was collected as product to be used in e.g. phosgene plants, while the CO-lean exit stream (306) from the pressure-swing adsorber unit was mixed with the first cathode-side feed stream (301), as described above. A first anode-side feed stream (204), comprising ≥99.9% $CO_2$, was pre-heated to 785° C., and the resulting preheated first anode-side feed stream (205) was fed to the anode-side of both stacks. As a result of the electrolysis current passing through the stacks, gaseous $O_2$ was electrochemically generated on the anode sides of the cells in the stacks, whereby a first anode-side product gas (206), enriched in oxygen, was obtained. The first anode-side product gas (206) comprised $CO_2$ and $O_2$ and was notably low in nitrogen content. The precise nitrogen content was not measured, but was estimated to be below 50 ppm. The temperature of the first anode-side product gas (206) exiting the stacks was 791-793° C. during the experiment. The stack voltages required to maintain an electrolysis current of approximately 45 A were between 97 V and 103 V (FIG. 8b). Surprisingly, no significant performance degradation was observed while operating the solid oxide electrolysis cells using an anode-side stream comprising ≥99.9% $CO_2$.

The invention claimed is:
1. A method for supplying oxygen-enriched gas to an oxygen-consuming process that is an oxy-calcining process, in which at least one operating solid oxide electrolysis cell is provided having a cathode side and an anode side, and
   a) a cathode-side feed gas stream comprising steam or $CO_2$ or a mixture thereof is supplied to the cathode side of the at least one solid oxide electrolysis cell,
   b) at least part of the cathode-side feed gas stream is electrochemically reduced in the solid oxide electrolysis cell, thereby forming a cathode-side product gas stream that is enriched in hydrogen, carbon monoxide or a mixture thereof, c) at least part of the cathode-side product gas stream is supplied to a hydrogen- and/or carbon monoxide-consuming process,
d) an anode-side feed gas stream comprising $CO_2$ is supplied to the anode side of the solid oxide electrolysis cell, and
e) oxygen is electrochemically generated on the anode side of the solid oxide electrolysis cell, thereby forming an anode-side product gas stream enriched in oxygen, wherein an oxygen-enriched gas comprising at least part of the anode-side product gas stream enriched in oxygen is fed to the oxygen-consuming process,
the oxygen-enriched gas has a low nitrogen content, the content of nitrogen being below 10 vol %, and
the oxygen-enriched gas exiting the solid oxide electrolysis cell has a temperature in the range of between 600° C. and 1000° C.,
wherein a stream of solid material comprising calcium carbonate is fed to the oxy-calcining process.

2. The method according to claim 1, wherein the temperature of the oxygen-enriched gas exiting the at least one solid oxide electrolysis cell is between 600° C. and 900° C.

3. The method according to claim 1, wherein the hydrogen or carbon monoxide or the mixture of hydrogen and carbon monoxide is electrochemically generated on the cathode-side of the at least one solid oxide electrolysis cell and the oxygen electrochemically generated on the anode-side of the at least one solid oxide electrolysis cell are generated at a molar ratio of (H2+CO):O2 of 2:1.

4. The method according to claim 1, wherein the anode-side product gas enriched in oxygen has an oxygen content of $0 < O_2 \leq 100\%$.

5. The method according to claim 1, wherein at least part of the anode-side product gas is recycled and used as at least part of the anode-side feed gas.

6. The method according to claim 1, wherein the at least part of the cathode-side product gas is recycled and used as at least part of the cathode-side feed stream.

7. The method according to claim 1, wherein a flue gas stream is obtained from the oxy-calcining process comprising carbon dioxide and is recycled and used as at least part of the cathode-side feed stream and/or the anode-side feed gas that is fed to the solid oxide electrolysis cell.

8. The method according to claim 1, wherein the hydrogen- and/or carbon monoxide-consuming process includes methanol production processes, ammonia production processes, hydrotreating processes, methanation processes, hydrogenation processes, carbonylation processes, hydroformulation (oxo synthesis) processes, or oxidative carbonylation processes.

9. The method according to claim 1, wherein the cathode-side feed stream comprises $CO_2$ and at least part of the $CO_2$ in the cathode-side feed gas stream and/or in the anode-side feed gas stream originates from one or more of the following:
metallurgy processes, cement production, carbon capture processes, direct air capture processes and carbon-based fuel combustion processes, including combustion of non-fossil fuels, or other processes where $CO_2$ is generated in one or more streams.

10. The method according to claim 1, wherein the nitrogen content in the oxygen-enriched stream is less than 1%.

11. The method according to claim 1, wherein the nitrogen content in the oxygen-enriched stream is less than 0.1%.

12. The method according to claim 1, wherein the solid oxide electrolysis cell is operating at thermoneutral voltage or within ±0.2 V/cell from the thermoneutral voltage.

13. A plant comprising:
a solid oxide electrolysis cell having an anode side and a cathode side;
an oxygen-consuming unit that is an oxy-calcining unit; and
a hydrogen- and/or carbon monoxide-consuming unit,
wherein the anode side of the cell is in fluid connection with the oxygen-consuming unit and the cathode side of the cell is in fluid connection with the hydrogen- and/or carbon monoxide-consuming unit, and wherein the plant is configured to operate the method according to claim 1.

14. A plant comprising:
a solid oxide electrolysis cell having an anode side and a cathode side;
an oxygen-consuming unit that is an oxy-calcining unit; and
a hydrogen- and/or carbon monoxide-consuming unit,
wherein the anode side of the cell is in fluid connection with the oxygen-consuming unit and the cathode side of the cell is in fluid connection with the hydrogen- and/or carbon monoxide-consuming unit, and wherein the plant is configured to operate a method for supplying oxygen-enriched gas to an oxygen-consuming process that is an oxy-calcining process, in which at least one operating solid oxide electrolysis cell is provided having a cathode side and an anode side, and
a) a cathode-side feed gas stream comprising steam or CO2 or a mixture thereof is supplied to the cathode side of the at least one solid oxide electrolysis cell,
b) at least part of the cathode-side feed gas stream is electrochemically reduced in the solid oxide electrolysis cell, thereby forming a cathode-side product gas stream that is enriched in hydrogen, carbon monoxide or a mixture thereof,
c) at least part of the cathode-side product gas stream is supplied to a hydrogen- and/or carbon monoxide-consuming process,
d) an anode-side feed gas stream comprising CO2 is supplied to the anode side of the solid oxide electrolysis cell, and
e) oxygen is electrochemically generated on the anode side of the solid oxide electrolysis cell, thereby forming an anode-side product gas stream enriched in oxygen, wherein an oxygen-enriched gas comprising at least part of the anode-side product gas stream enriched in oxygen is fed to the oxygen-consuming process,
the oxygen-enriched gas has a low nitrogen content, the content of nitrogen being below 10 vol %, and
the oxygen-enriched gas exiting the solid oxide electrolysis cell has a temperature in the range of between 600° C. and 1000° C.,
wherein the oxygen-consuming unit and the hydrogen- and/or carbon monoxide-consuming unit is one and the same oxy-calcining unit.

15. The plant according to claim 13, wherein the plant comprises control means configured to control the flow from the anode side of the solid oxide electrolysis cell to the oxygen-consuming unit.

16. The plant according to claim 13, wherein the plant comprises control means configured to control the flow from the cathode side of the solid oxide electrolysis cell to the hydrogen- and/or carbon monoxide-consuming unit.

17. The plant according to claim 13, wherein the oxygen-consuming unit and the hydrogen- and/or carbon monoxide-consuming unit is one and the same oxy-calcining unit.

18. The method according to claim 1, wherein the content of nitrogen is below 1 vol %.

19. The method according to claim 1, wherein the content of nitrogen is below 0.1 vol %.

* * * * *